Dec. 1, 1964     C. W. WEILAND     3,159,361
AIRCRAFT
Filed Feb. 14, 1962     2 Sheets-Sheet 2
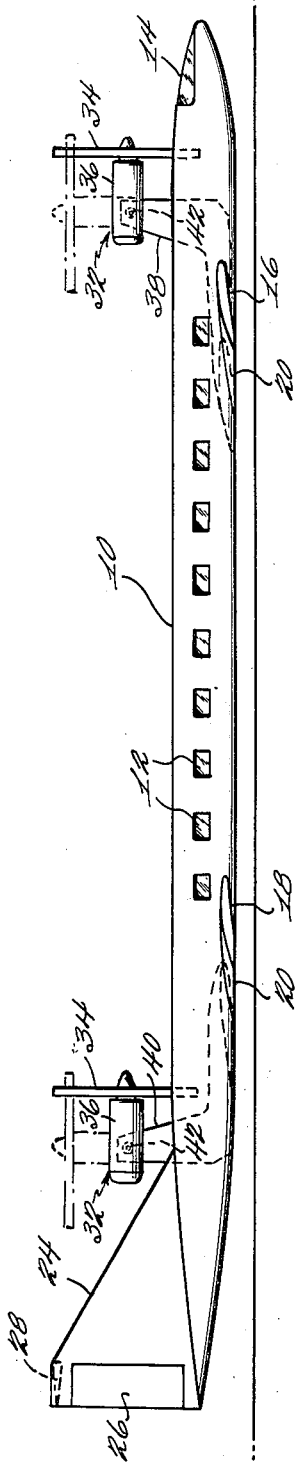
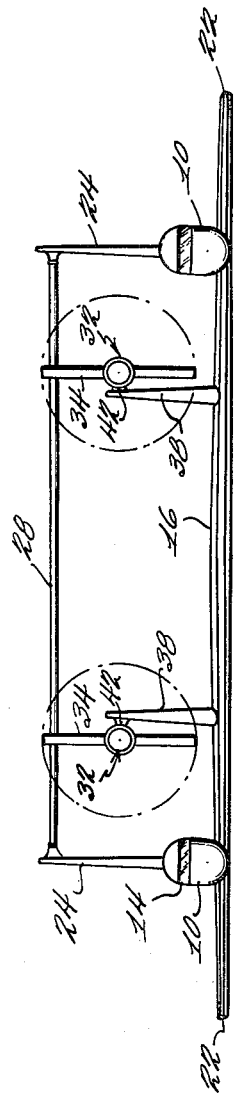
INVENTOR.
CARL W. WEILAND
BY
Cushman, Darby & Cushman
ATTORNEYS

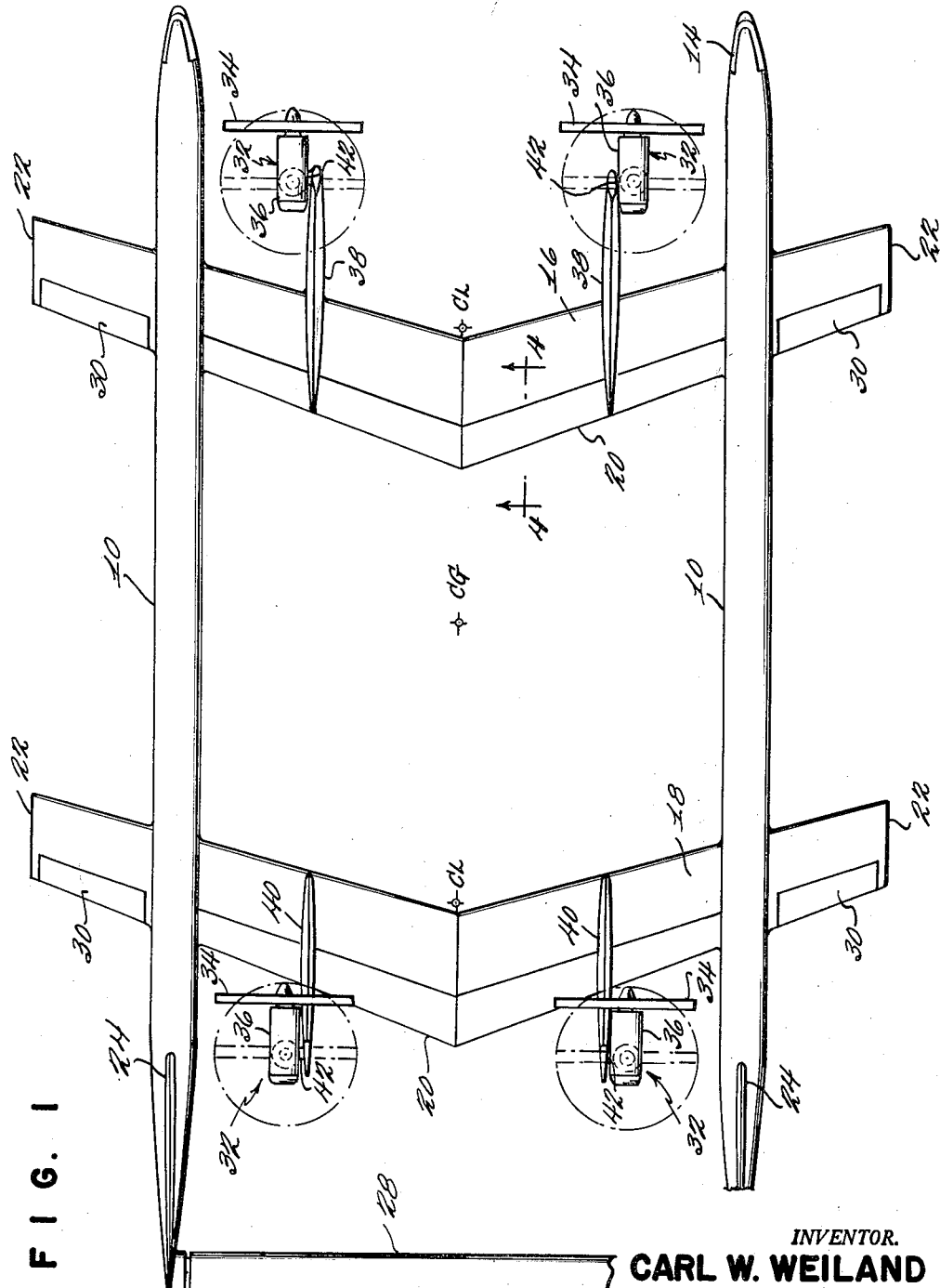

3,159,361
AIRCRAFT
Carl W. Weiland, 1816 Knollwood Road, Louisville, Ky.
Filed Feb. 14, 1962, Ser. No. 173,155
19 Claims. (Cl. 244—12)

This invention relates to a vehicle and, more particularly, to a fixed wing aircraft especially adapted to take advantage of the phenomenon known as ground effect.

When a fixed aerodynamic lifting wing of an aircraft travels generally parallel and in close proximity to the earth, the normal aerodynamic lift of the wing is considerably augmented without any increase in drag. This phenomenon, known as ground effect, results in higher lift vs. drag ratios, which, of course, increase the efficiency of the aircraft. Thus, a fixed wing aircraft which operates in sufficient proximity to the earth to enjoy ground effect, can carry greater loads than when operated with the same power at higher altitudes above the ground effect zone.

Of course, practical operation within the ground effect zone can be achieved only where the earth surface is relatively flat and free of obstructions which would necessitate abrupt altitude or course deviations. Such conditions usually are not found on land areas which are frequently traversed. On the other hand, water areas, such as oceans, seas and lakes, usually satisfy the conditions necessary for practical operation of an aircraft in the ground effect zone. Hence, a fixed wing aircraft designed to operate primarily within the ground effect zone, should also be adapted to operate primarily over water.

Accordingly, it is an object of this invention to provide a fixed wing aircraft especially designed to operate within the ground effect zone with resultingly increased efficiency.

It is another object of this invention to provide an aircraft of the type under consideration especially designed to operate over and to take off from and land on water.

Other objects of the invention will become apparent from the following description and accompanying drawings in which:

FIGURE 1 is a plan view of an aircraft embodying this invention.

FIGURE 2 is a side view of the aircraft shown in FIGURE 1.

FIGURE 3 is a front view of the aircraft shown in FIGURE 1.

FIGURE 4 is an enlarged fragmentary sectional view taken substantially on line 4—4 of FIGURE 1.

Referring now to the drawings, the aircraft has two elongated aerodynamically streamlined substantially identical hulls 10 arranged in spaced parallel side-by-side relation. The hulls 10 are water-tight and buoyant with their interiors arranged to carry passengers or other cargo. If passengers are to be carried, the hulls 10 desirably are provided with side windows 12, as shown in FIGURE 2. The aircraft may be controlled from a flight deck 14 located at the forward end of one or the other of the hulls 10. The undersurface of each hull 10 is smooth and uninterrupted throughout its entire length, as shown in FIGURE 2, and does not, for example, embody a step which usually is required in a conventional seaplane hull to facilitate take-off.

The hulls 10 are interconnected by two substantially identical fixed wings 16 and 18 spaced forwardly and aft, respectively, of the center of gravity CG of the aircraft. As shown in FIGURE 2, the wings 16 and 18 are set at a positive angle of attack relative to the hulls 10 and connected thereto adjacent the lower portions thereof. Preferably, the wings 16 and 18 are arranged so that the adjacent portions of the hulls 10 and the trailing edges 20 of each wing are substantially flush with each other, as shown in FIGURES 2 and 3. The wings 16 and 18 preferably are also watertight and buoyant so as to aid the hulls 10 in floating the aircraft on water.

Desirably, each wing 16 and 18 tapers outwardly from its center to stub tips 22 disposed laterally outwardly of the corresponding hull 10. Each wing 16 and 18 has negative sweepback which may be sufficient, as shown in FIGURE 1 of the drawings, for its center of lift CL to be disposed slightly in advance of the center of its leading edge. The two centers of lift CL are equidistant from the center of gravity CG of the aircraft so that the latter is effectively balanced in pitch. Each wing also is characterized by the absence of a positive dihedral angle, and desirably such angle is zero, as shown in FIGURE 3, so that the trailing edge 20 of each wing is disposed in a horizontal plane. The taper ratio of each wing 16 and 18 may be, for example, of the order of one in ten, so that a wing with a span of 120 feet may have a chord of 18 feet at the center and 12 feet at its blunt wing tips. Exemplary of other proportions of the aircraft, are an over-all length of 190 feet and a spacing of 80 feet between the centers of the hulls 10.

The above-described characteristics of the wings 16 and 18, i.e., negative sweepback, zero dihedral angle, and a positive angle of attack relative to the hulls 10, serve to enhance the ground effect because of the ram effect on air disposed between the wings and the earth when the aircraft is operated at high speed in the ground effect zone. The upper limit of such zone is at a height equal to about half the effective chord of the wing in question. Hence, an aircraft having the proportions described above encounters ground effect as high as about seven and one-half feet above the earth.

The aircraft thus far described is inherently stable when airborne and enjoying ground effect because if it should pitch somewhat, and thus bring one wing 16 or 18 nearer to the earth than the other, the ground effect on such wing would increase with a resulting increase in lift which would tend to raise the low wing back to the level of the other. The same action occurs if the aircraft rolls, i.e., the increase in ground effect on the low wing tips 22 inherently tends to lift the same and bring the wings 16 and 18 back to the horizontal. Hence, if the aircraft is operated solely in close proximity to the earth to take advantage of the ground effect phenomenon, with its increased operating efficiency, pitch and roll control devices, such as elevators and ailerons, are not essential. Thus, the aircraft need only be equipped with vertical stabilizers 24 upstanding from the aft end of each hull 10 and with directional control devices, such as rudders 26 (FIGURE 2) conventionally mounted at the trailing end of each vertical stabilizer for operation in synchronism.

On the other hand, it will be recognized that an aircraft of the size contemplated will undergo weight unbalances, as from improper cargo distribution and possible weight shifts, which will necessitate some degree of pitch and roll control for trimming purposes, if for no other. For this purpose, there is provided a pitch control in the form of an elevator 28 mounted for pivotal movement about a horizontal axis and which extends between and connects the vertical stabilizers 24 adjacent the upper aft ends of the latter above the rudders 26. Similarly, the aircraft is provided with a roll control in the form of ailerons 30 adjacent the tips 22 of one or both wings 16 and 18.

The aircraft also in inherently stable when afloat. The wide spacing between the twin hulls 10 has a catamaran effect which reduces roll and relieves the wings 16 and 18 of undue rolling stresses which would be imposed thereon by a single hull design. The long hulls 10 also contribute to pitch stability in heavy seas while tending to maintain the leading edges of the wings 16 and 18 clear of the water for more effective take-off.

The aircraft may be powered by any suitable thrust producers, but for purposes of illustration the thrust producers 32 shown in the drawings each include a variable pitch propeller 34 and a motor 36 therefor, such as a gas turbine enclosed within a suitable housing. Such combination has come to be known as a turbo-prop. Of course, it will be realized that other thrust producers, such as plain jet engines, could be substituted for the illustrated turbo-prop combinations 32. Four thrust producers 32 are shown in the drawings, two mounted on and above each wing 16 and 18 in laterally spaced relation by upstanding fin-like brackets 38 and 40, respectively, so that the lowest point of the arc of the propeller tips is well above the water when the aircraft floats therein. The brackets 38 on the forward wing 16 extend forwardly thereof, while those 40 on the aft wing 18 extend rearwardly thereof, as shown in FIGURES 1 and 2. The motor 36 of each thrust producers 32 is pivotally mounted, as at 42, at the upper end and at the laterally outer side of its corresponding bracket 38 or 40 for rotation about a substantially horizontal axis normal to the centerline of thrust of the thrust producers 32. Thus, the rotational axis of each propeller 34 can be changed from a horizontal to a vertical position, shown in dotted lines in FIGURES 1 and 2, and thus change the direction of thrust from forward to upward, or adjust it to any intermediate position. Preferably, the mounting 42 will permit each thrust producer 32 to be tilted slightly rearwardly from the vertical. For the purpose of balancing the several moments created by the thrust producers 32 about the center of gravity CG of the aircraft, the intersections of the line of thrust with the axis of pivotal movement of the thrust producers are equidistant from the center of gravity. Suitable mechanism (not shown) is provided for controllably pivoting all the thrust producers 32 in synchronism.

Desirably, the combined maximum thrust of the several thrust producers 32 is at least slightly greater than the weight of the loaded aircraft so that when the thrust producers are tilted to their vertical positions, sufficient upward thrust can be developed to lift the aircraft vertically. As the aircraft rises slightly from the water, the thrust producers 32 are tilted slightly forwardly so as to produce a component of forward thrust. As the aircraft consequently begins to move forwardly, the wings 16 and 18 commence to develop lift, thus permitting the thrust producers 32 to be tilted even farther forwardly with a resulting increase in forward speed and consequent increase in lift. Following this procedure, the thrust producers 32 finally can be tilted to their horizontal axes after the wings 16 and 18 have assumed all of the aerodynamic support for the aircraft. Because the aircraft is capable of taking off in this fashion, it will be seen that take-off can be accomplished even in relatively rough seas. When airborne entirely by the wings 16 and 18, the aircraft desirably is operated within ground effect, so that it skims above the wave crests. At this altitude, because the aircraft will be operating in ground effect, the power supplied by the engines 36 can be reduced tremendously. In fact, since the power required for cruising in the ground effect zone is only a very small fraction of the power required for vertical take-off, during cruising conditions either the fore or the aft engines 36 can be stopped and their propellers 34 feathered. In the event that an obstacle, such as a ship or a small island, is encountered, power can be increased sufficiently, with a consequent increase in speed, to cause the aircraft to climb out of the ground effect zone and over the obstacle. In such event, it will be seen that pitch and roll control, effected by the elevator 28 and the ailerons 30 becomes essential. On the other hand, when cruising within the ground effect zone, these two controls usually will be necessary only for trimming purposes.

For landing purposes, the aircraft desirably is provided with flaps 44, which may be arranged on the trailing edges 20 of the wings 16 and 18 between the hulls 10. As shown in FIGURE 4, these flaps 44 may be operated by any conventional means, as by a hydraulic cylinder 46 pivotally connected to interior wing structure, as at 48, and having the end of its piston rod 50 pivotally connected to a crank arm 52 on an operating shaft 54 for a flap 44. Since the aircraft lands in water, however, and since the flaps 44, when extended, will project below the undersurface of the hulls 10, and below the normal trailing edges 20 of the fixed wings 16 and 18, the flaps will be the first portions of the aircraft to encounter the water. Consequently, the flaps 44 desirably are yieldably mounted so as to pivot upwardly and rearwardly on encountering an obstruction other than air, i.e., on encountering water on landing with any forward motion of the aircraft. For this purpose, a yieldable member is inserted between the piston rod 50 and the shaft 54, such as a coil compression spring 56, preloaded as by rods 58 and interposed between the end of the rod 50 and the crank arm 52.

In a normal landing for the aircraft, the flaps 44 are extended usually only to reduce forward speed after which the power supplied to the thrust producers 32 is slowly increased while the latter are progressively tilted from their horizontal to their vertical positions, until the aircraft is hovering at low altitude. Reduction of forward speed can also be augmented by tilting the thrust producers 32 slightly rearwardly from the vertical, as will be understood by those skilled in the art. The flaps 44 can then be retracted. Progressive power reduction will then cause the aircraft to land substantially vertically without any forward motion. In this connection, it will be seen that in order to properly counteract the turning torques of the propellers 34, and also the so-called "propeller fin effect" which occurs when the axis of the propellers is other than horizontal, it is desirable for the propellers on opposite sides of the aircraft longitudinal centerline to turn in opposite directions.

When the vehicle is landed as described above, the flaps 44 are retracted before the aircraft touches the water. On the other hand, in the event of a failure of one of the thrust producers 32, the opposite thrust producer on the other wing of the aircraft must be stopped before any of the thrust producers are tilted from their horizontal to their vertical positions in order to properly balance the vertical components of the moments of the thrust producers about the center of gravity CG. Since, in such event, the combined maximum thrust of the thrust producers 32 still operating will not equal the weight of the aircraft, a landing must be effected wherein the aircraft has some forward movement in order to enable the wings 16 and 18 to support some of the weight. Such necessary forward movement can be maintained, to a great extent, by inertia or gliding, so that the operative thrust producers 32 still can be tilted to the vertical when making a landing with less than all of the thrust producers operating. In such a landing, it may be desirable to maintain the flaps 44 extended until touchdown. The flaps 44 then will encounter the water first, but they will yield rearwardly to prevent any damage thereto, because of the yieldability of the coil compression spring 56.

Although it is desirable for the thrust producers to be capable of producing a combining maximum thrust slightly greater than the weight of the aircraft so as to permit vertical take-off, such being particularly desirable and advantageous in rough seas, it will be realized that power compromises some times must be made. Accordingly, the aircraft still can operate most effectively even though the combined maximum thrust of the thrust producers is not even equal to the weight of the aircraft. In such event, take-off will be effected by an initial tilting of the thrust producers nearly to the vertical so as to greatly relieve the weight of the aircraft which is borne by the water, thus enabling forward acceleration to take place with a minimum of power. Such forward acceleration will occur because of the forward component of thrust which still exists when the thrust producers are tilted slightly forwardly from the vertical. Take-off will then be effected in the manner aforedescribed, i.e., by progressively tilting the thrust producers toward the horizontal as forward speed of the aircraft increases. Since a considerable portion of the weight of the aircraft during such a take-off will be borne by the thrust producers, however, it will be seen that the intensity of shocks to the aircraft occasioned by its forward movement through rough seas will be greatly reduced. Of course, landing with thrust producers having such lesser combined maximum thrust will be effected in the same manner as aforedescribed in the event of a failure of a thrust producer which results in decreasing the combined maximum thrust to a value less than the total weight of the aircraft, i.e., landing is effected with some forward speed so that the wings will support some of the weight until actual touchdown.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A vehicle of the type described comprising: a pair of buoyant hulls disposed in spaced parallel side-by-side relation; a pair of substantially identical wings connecting said hulls adjacent the lower portions of the latter, the centers of lift of said wings being spaced at substantially equal distances, respectively, forwardly and aft of the center of gravity of said vehicle; aerodynamic rudder means carried by said vehicle; and forward thrust producing means mounted on said vehicle above said wings, said vehicle having no non-retractable portions extending below said wings a distance sufficient to prevent flight operation of said vehicle at an altitude within which the ground effect phenomenon is effective.

2. The structure defined in claim 1 in which the thrust producing means comprises a plurality of thrust producers arranged symmetrically with respect to the longitudinal centerline of the vehicle and capable of developing a maximum combined thrust greater than the weight of said vehicle, and including means mounting said thrust producers for controllable tilting of the axes thereof between substantially horizontal and substantially vertical positions, said thrust producers being arranged so that when their axes are vertical the thrust moments about the center of gravity of the vehicle are substantially balanced.

3. The structure defined in claim 2 in which the thrust producers comprise two laterally-spaced engine-driven propellers mounted on each wing.

4. The structure defined in claim 1 in which both wings have a positive angle of attack relative to the hulls.

5. The structure defined in claim 1 in which both wings have negative sweepback.

6. The structure defined in claim 1 in which both wings have a positive angle of attack and negative sweepback.

7. The structure defined in claim 6 in which the thrust producing means comprises a plurality of thrust producers arranged symmetrically with respect to the longitudinal centerline of the vehicle and capable of developing a maximum combined thrust greater than the weight of said vehicle, and including means mounting said thrust producers for controllable tilting of the axes thereof between substantially horizontal and substantially vertical positions, said thrust producers being arranged so that when their axes are vertical the thrust moments about the center of gravity of the vehicle are substantially balanced.

8. The structure defined in claim 1 including elevator means carried by the vehicle above the wings.

9. The structure defined in claim 1 in which the wings are buoyant.

10. The structure defined in claim 1 in which both wings project laterally beyond the opposite sides of the hulls.

11. The structure defined in claim 1 in which both wings have substantially zero dihedral angle.

12. The structure defined in claim 1 in which the trailing edge of each wing is disposed in a substantially horizontal plane substantially flush with the underside of both hulls.

13. A vehicle of the type described comprising: a pair of buoyant hulls arranged in spaced parallel side-by-side relation; a pair of substantially identical wings having a positive angle of attack, negative sweepback, and a dihedral angle not greater than about 0° connecting said hulls adjacent the lower portions of the latter, the centers of lift of said wings being spaced at substantially equal distances respectively forwardly and aft of the center of gravity of said vehicle; aerodynamic rudder means carried by said vehicle; and forward thrust producing means carried by said vehicle above said wings, said vehicle having no non-retractable portions extending below said wings a distance sufficient to prevent flight operation of said vehicle at an altitude within which the ground effect phenomenon is effective.

14. The structure defined in claim 13 in which the thrust producing means comprises a plurality of thrust producers arranged symmetrically with respect to the longitudinal centerline of the vehicle and capable of developing a maximum combined thrust greater than the weight of said vehicle, and including means mounting said thrust producers for controllable tilting of the axes thereof between substantially horizontal and substantially vertical positions, said thrust producers being arranged so that when their axes are vertical the thrust moments about the center of gravity of the vehicle are substantially balanced.

15. The structure defined in claim 13 in which the hulls are spaced apart a distance less than the span of said wings but more than half of said span.

16. A vehicle of the type described comprising: a pair of buoyant hulls disposed in spaced parallel side-by-side relation; a pair of substantially identical wings connecting said hulls adjacent the lower portions of the latter, the centers of lift of said wings being spaced at substantially equal distances respectively forwardly and aft of the center of gravity of said vehicle; aerodynamic rudder means carried by said vehicle; at least two forward thrust producers mounted on and above each wing at equal distances from and on opposite sides of the longitudinal centerline of said vehicle, said thrust producers being capable of developing a combined thrust greater than the weight of said vehicle; and means mounting said thrust producers for controllable tilting of their axes between substantially horizontal and substantially vertical positions, said thrust producers mounted on the forward wing being substantially forward of the leading edge thereof in both of said positions and said thrust producers mounted on the aft wing being substantially aft of the trailing edge thereof in both of said positions, said vehicle having no non-retractable portions extending below said wings a distance sufficient to prevent flight operation of said vehicle at an altitude within which the ground effect phenomenon is effective.

17. A vehicle of the type described comprising: a pair of buoyant hulls disposed in spaced parallel side-by-side relation; a pair of substantially identical wings connecting said hulls adjacent the lower portions of the latter, the centers of lift of said wings being spaced at substantially equal distances respectively forwardly and aft of the center of gravity of said vehicle; aerodynamic rudder means carried by said vehicle; at least two forward thrust producers mounted on and above each wing at equal distances from and on opposite sides of the longitudinal centerline of said vehicle, said thrust producers being capable of developing a combined thrust greater than the weight of said vehicle; and means mounting said thrust producers for controllable tilting of their axes between substantially horizontal and substantially vertical positions, the axes of said thrust producers in said vertical position, being substantially equidistant from the center of gravity of said vehicle, said vehicle having no non-retractable portions extending below said wings a distance sufficient to prevent flight operation of said vehicle at an altitude within which the ground effect phenomenon is effective.

18. A vehicle of the type described comprising: a pair of buoyant hulls disposed in spaced parallel side-by-side relation; a pair of substantially identical wings connecting said hulls adjacent the lower portions of the latter, the centers of lift of said wings being spaced at substantially equal distances respectively forwardly and aft of the center of gravity of said vehicle; aerodynamic rudder means carried by said vehicle; forward thrust producing means mounted on said vehicle above said wings; trailing flaps for said wings; and means mounting said flaps for upward and rearward yielding movement when extended, whereby damage thereto is prevented on encountering an obstruction during forward movement of said vehicle, said vehicle having no non-retractable portions extending below said wings a distance sufficient to prevent flight operation of said vehicle at an altitude within which the ground effect phenomenon is effective.

19. A vehicle of the type described comprising: a pair of buoyant hulls disposed in spaced parallel side-by-side relation; a pair of substantially identical wings connecting said hulls adjacent the lower portions of the latter, the centers of lift of said wings being spaced at substantially equal distances, respectively, forwardly and aft of the center of gravity of said vehicle; aerodynamic rudder means carried by said vehicle; a plurality of thrust producers mounted on said vehicle above said wings and arranged symmetrically with respect to the longitudinal centerline of said vehicle; and means mounting said thrust producers for controllable tilting of the axes thereof between a substantially horizontal forward-thrust-producing position and a substantially vertical upward-thrust-producing position, said thrust producers being arranged so that when their axes are vertical the thrust moments about the center of gravity of the vehicle are substantially balanced, said vehicle having no non-retractable portions extending below said wings a distance sufficient to prevent flight operation of said vehicle at an altitude within which the ground effect phenomenon is effective.

References Cited in the file of this patent

UNITED STATES PATENTS

| | | |
|---|---|---|
| 1,376,675 | Casper | May 3, 1921 |
| 1,412,848 | Dunajeff | Apr. 18, 1922 |
| 2,624,532 | Butler | Jan. 6, 1953 |
| 2,656,136 | Martin | Oct. 20, 1953 |
| 3,037,721 | Stefanutti | June 5, 1962 |
| 3,077,321 | Dunham | Feb. 12, 1963 |
| 3,082,976 | Dornier | Mar. 26, 1963 |

FOREIGN PATENTS

| | | |
|---|---|---|
| 825,442 | Great Britain | Dec. 16, 1959 |